March 16, 1965 J. J. POWLAS 3,173,517
BRAKE WITH SERVO ACTUATOR
Filed July 27, 1962 5 Sheets-Sheet 1

FIG_1

INVENTOR.
JAMES J. POWLAS.
BY
Sheldon F. Raizes
ATTORNEY.

March 16, 1965   J. J. POWLAS   3,173,517
BRAKE WITH SERVO ACTUATOR
Filed July 27, 1962   5 Sheets-Sheet 2

FIG_2

INVENTOR.
JAMES J. POWLAS.
BY Sheldon F. Raizes
ATTORNEY.

INVENTOR.
JAMES J. POWLAS.

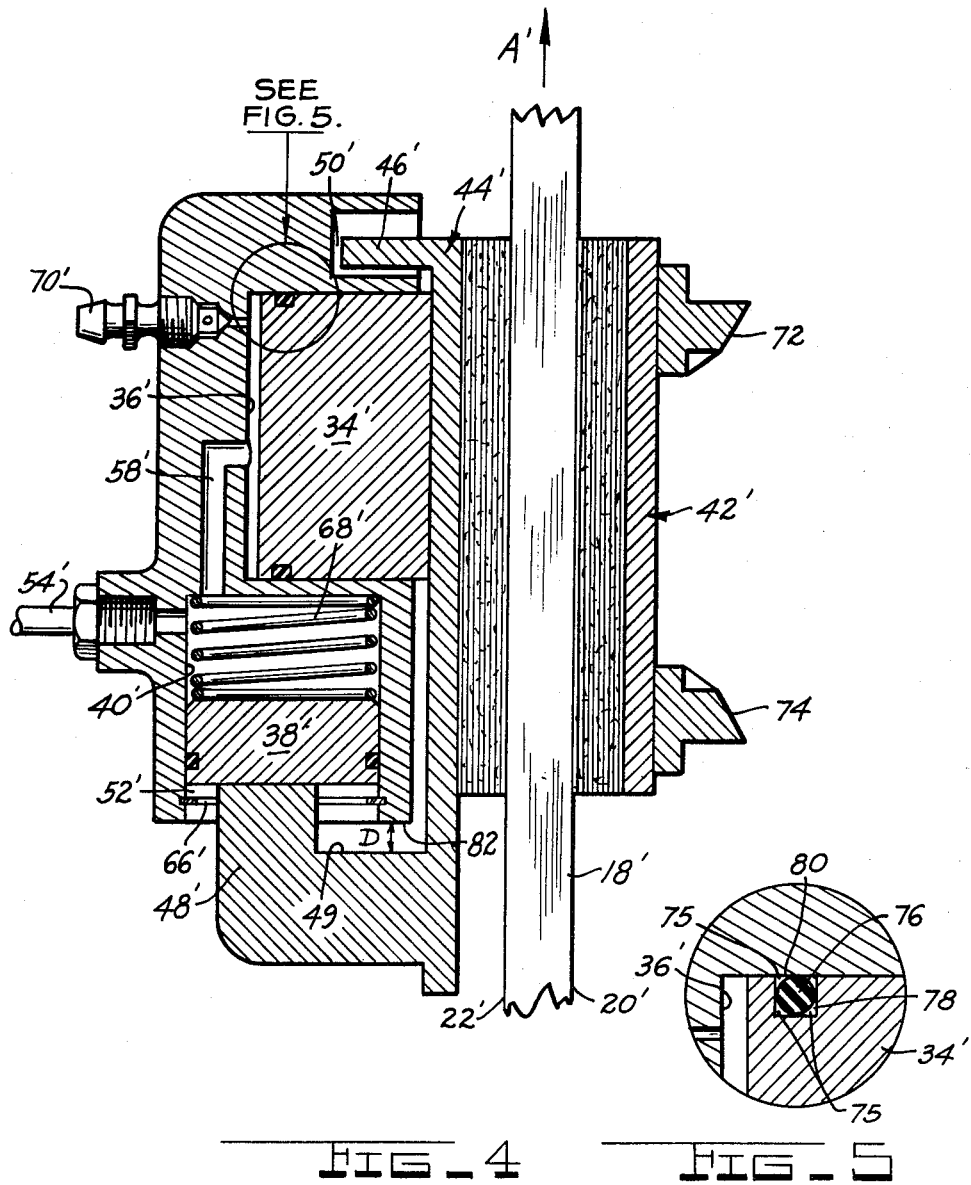

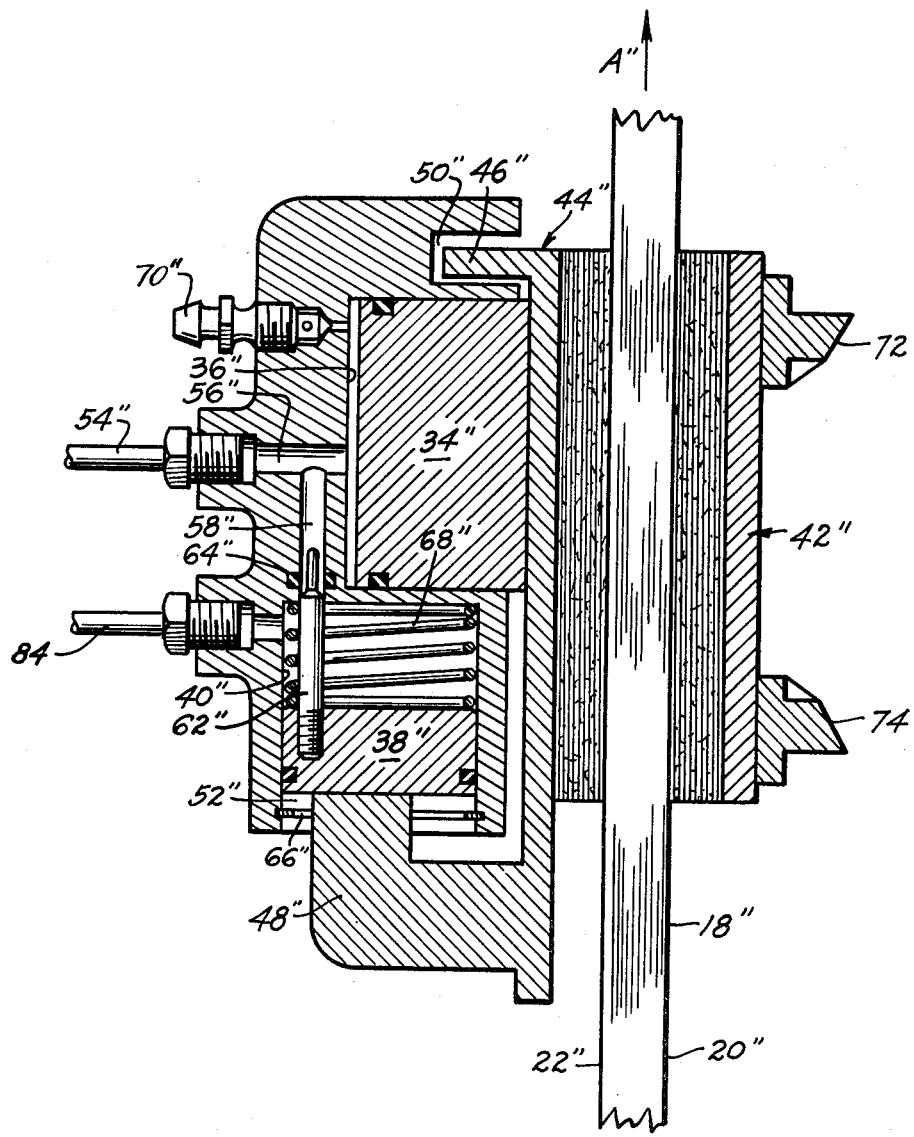

United States Patent Office 3,173,517
Patented Mar. 16, 1965

3,173,517
BRAKE WITH SERVO ACTUATOR
James J. Powlas, South Bend, Ind., assignor to The Bendix Corporation, South Bend, Ind., a corporation of Delaware
Filed July 27, 1962, Ser. No. 212,950
10 Claims. (Cl. 188—152)

This invention relates to a disc brake and more particularly, to a disc brake with servo action.

An object of this invention is to provide a disc brake wherein torque exerted by a rotor disc on a friction member is transposed into a force for effecting greater braking force acting on the rotor.

Another object of this invention is to provide a brake with means for transposing torque exerted by a rotor disc on a friction member into force for displacing fluid from a chamber of the brake.

Still another object of the invention is to provide a disc brake of the opposed cylinder stationary housing type wherein torque transmitted to at least one of the friction elements by the rotor is transposed into a force which produces more braking effect on the rotor by the friction elements.

A further object of the invention is to provide a disc brake of a single actuator type in which one friction element is acted upon by actuating means to engage the rotor and a thrust reaction is transferred through a movable housing to move a friction element on the other side of the rotor into engagement with its respective rotor friction surface, whereby torque transmitted to the first friction element by the rotor is utilized for producing fluid displacement.

Still a further object of this invention is to provide a brake system with a disc brake wherein torque exerted by a rotor disc on a friction member of the disc brake is transposed into a force for effecting increased braking force in a brake system.

An additional object of this invention is to provide a brake system with a brake wherein torque exerted by a rotor disc on a friction member is transposed into a force for actuating another brake of the system.

An over-all object of the invention is to provide a disc brake with the above named features wherein the resulting structure is efficient and simple to construct.

The above and other objects and features of the invention will be apparent from the following description of the device taken in connection with the accompanying drawings which form a part of this specification and in which:

FIGURE 4 is a view taken along section line 4—4 of FIGURE 3;

FIGURE 5 is an enlarged view of a seal and groove construction of FIGURE 4; and

FIGURE 6 is a modification of the embodiment of FIGURE 4.

Figure 1:
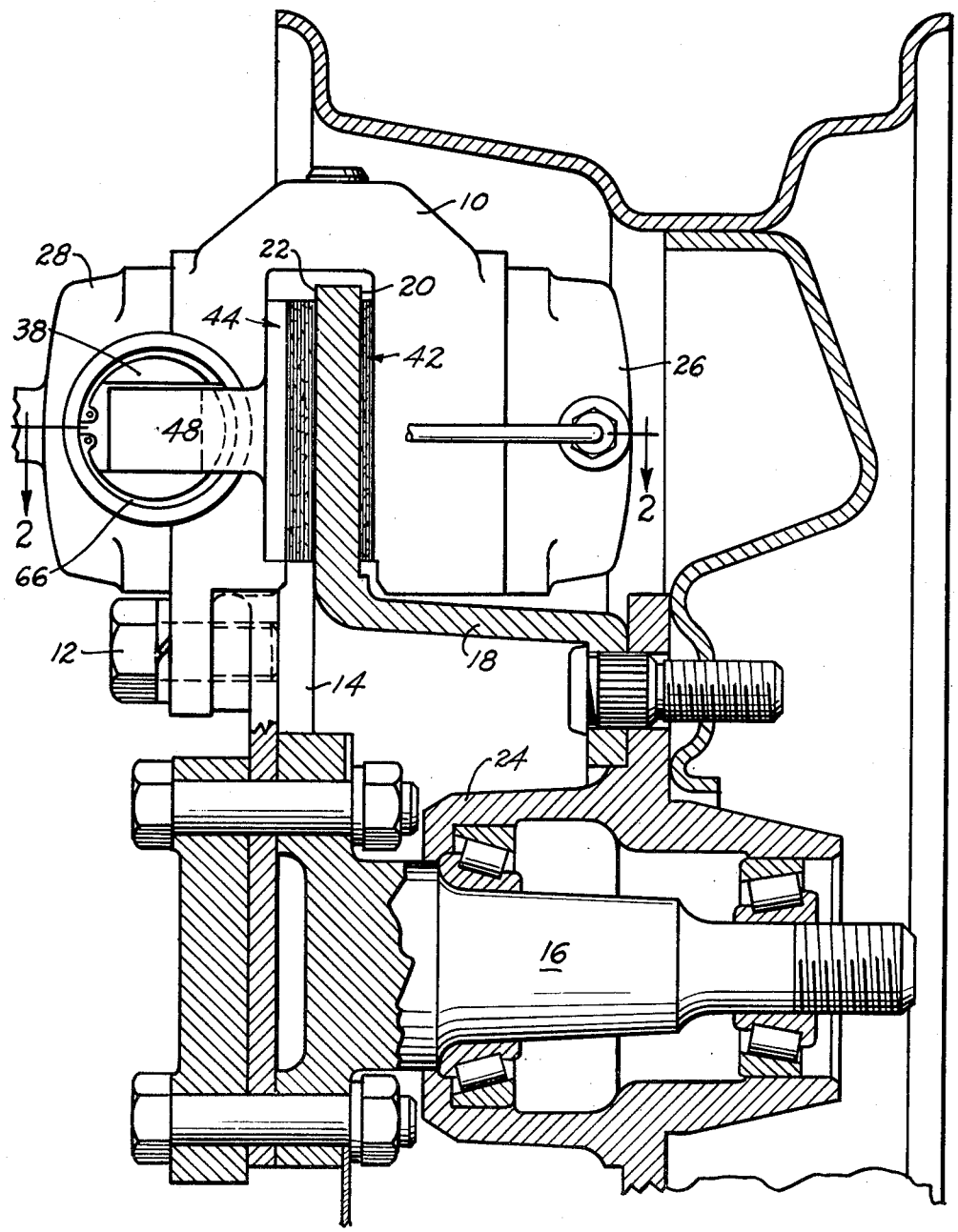
FIGURE 1 is a side elevational view illustrating a brake of the opposed actuator type.
Figure 2:
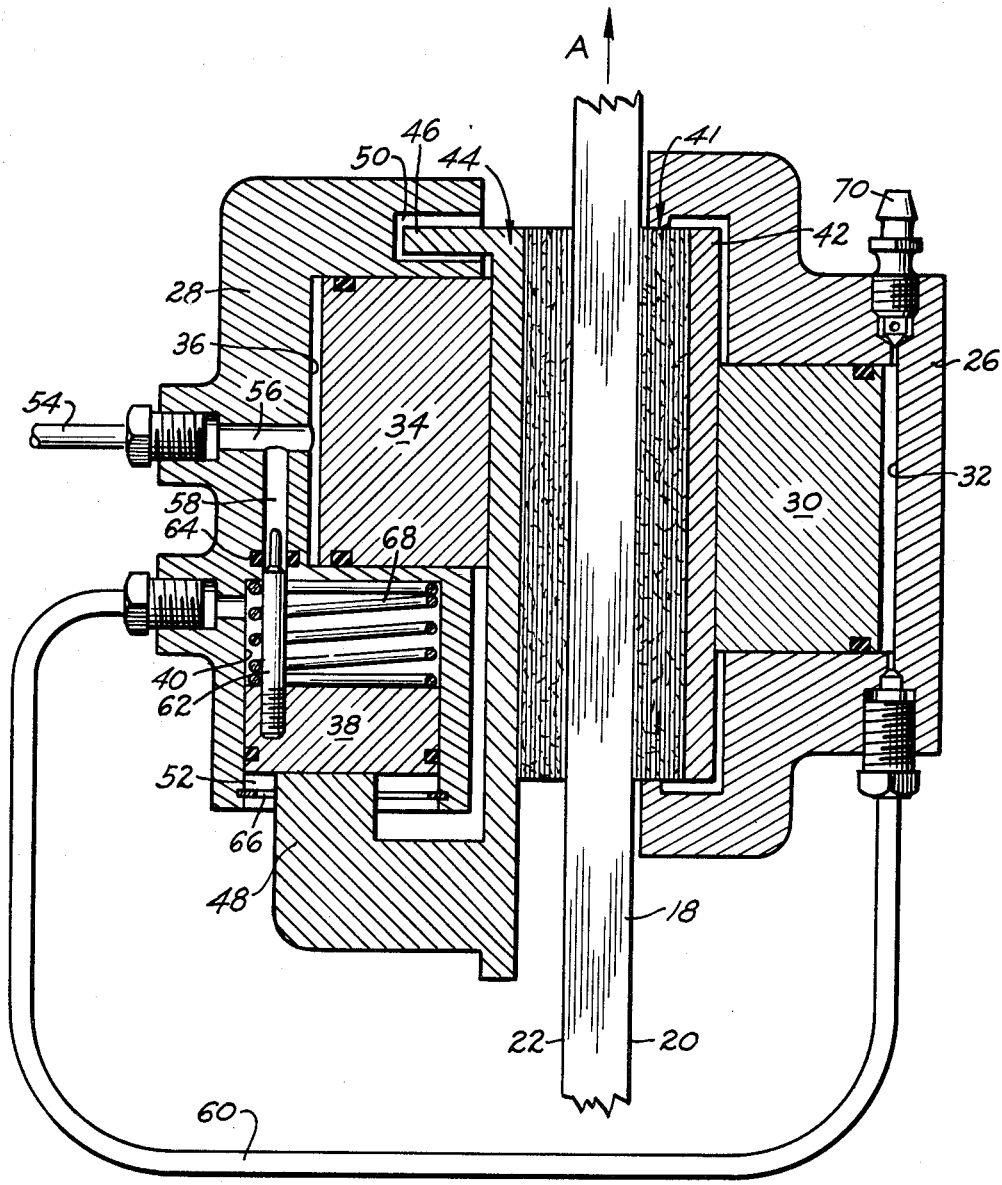
FIGURE 2 is a view taken along section line 2—2 of FIGURE 1.

Referring to FIGURES 1 and 2, a stationary housing 10 is mounted by bolts 12 to a bracket 14, which is in turn connected to a stationary part of a vehicle, for instance, a spindle 16. A rotor 18 with friction surfaces 20 and 22 is mounted on a rotatable hub 24. The stationary housing 10 has opposed cylinders 26 and 28 having fluid actuated pistons therein. The cylinder housing 26 has a fluid operated piston 30 slidably mounted within a chamber 32, and the cylinder housing 28 has a piston 34 slidably mounted within a fluid chamber 36 and also has a piston 38 slidably mounted within a fluid chamber 40. A friction member 42 is slidably guided by the annular flange 41 of the housing 10 and is located between the piston 30 and the rotor friction surface 20 and a friction member 44 is slidably guided between the piston 34 and the rotor friction surface 22. The friction member 44 has projections 46 and 48 extending therefrom with the projection 46 being slidably guided in a recess 50 in the housing and the projection 48 being slidably mounted in a groove 52, located on the piston 38. A tube 54 leads from a master cylinder (not shown) to the housing 10 and communicates chamber 36 with the master cylinder by passage 56. The fluid chamber 40 is connected with the fluid chamber 36 by a passage 58 and the fluid chamber 40 is communicated with the fluid chamber 32 by a tube 60.

A valve spool 62 is rigidly connected to the piston 38 for opening and closing communication between the fluid chamber 36 and the fluid chamber 40. With the valve spool 62 in the position as shown in FIGURE 2, the fluid chamber 36 is communicated with the fluid chamber 40 and when the valve spool 62 is against its seat 64, communication between the chamber 36 and 40 is cut off. There is communication between the fluid chamber 40 and fluid chamber 32 at all times. A snap ring 66 is provided for maintaining the piston 38 within its cylinder bore and a spring 68 is provided for biasing the piston 38 into its unactuated position against the snap ring 66. As can be seen in FIGURE 2, there is clearance between the boundaries of recess 50 and the edges of the projection 46 of the friction member to allow for movement of the friction member in a plane parallel to the plane of the rotor.

In operation, upon actuation of the brake, fluid pressure is conducted by tube 54 into passage 56 and will move the piston 34 in an axial direction engaging the friction member 44 with the friction surface 22 of the rotor 18. Assuming the rotation of the rotor is in the direction of arrow A, then the friction member will also be moved in a plane parallel to the plane of the rotor in the direction of arrow A with the projection 48 bearing on piston 38 and moving the piston in the direction of arrow A. Upon movement of the piston in the direction of arrow A, the valve spool 62 will cut off communication between the fluid chamber 36 and the fluid chamber 40. Fluid in chamber 40 will be displaced by the piston 38 and will be communicated to the fluid chamber 32 and exert a force on piston 30, moving the piston 30 and the friction member 42 in an axial direction to engage the friction surface 20 of the rotor 18 and providing a servo effect. Thus, it can be seen that a substantially equal and controlled braking pressure will be exerted by each friction element 44 and 42, since the more force exerted on the piston 34 to move the friction member 44 against the rotor 18 a greater torque will be exerted by the rotor on the friction member 44 and be transferred to the piston 38 displacing more fluid thereby increasing the pressure in the fluid chambers 40 and 32 producing more force on the piston 30 and, therefore, the friction member 42. If the force exerted on the piston 34 and the friction member 44 is decreased, less torque will be exerted on the friction member 44 by the rotor 18 and, therefore, less force will be transmitted by the friction member to the piston 38 and the pressure in fluid chambers 40 and 32 will decrease resulting in a decrease of force acting on the friction elements to engage the friction element 42 with the rotor 18.

The above arrangement also provides a satisfactory bleeding arrangement, since in unactuated position the chambers 36, 40 and 32 are all connected to each other and can be bled through the bleeding screw 70. Furthermore, since all chambers are in communication with the master cylinder, more fluid is available to compensate for wear of the linings which results in a requirement of more fluid displacement.

Figure 3:
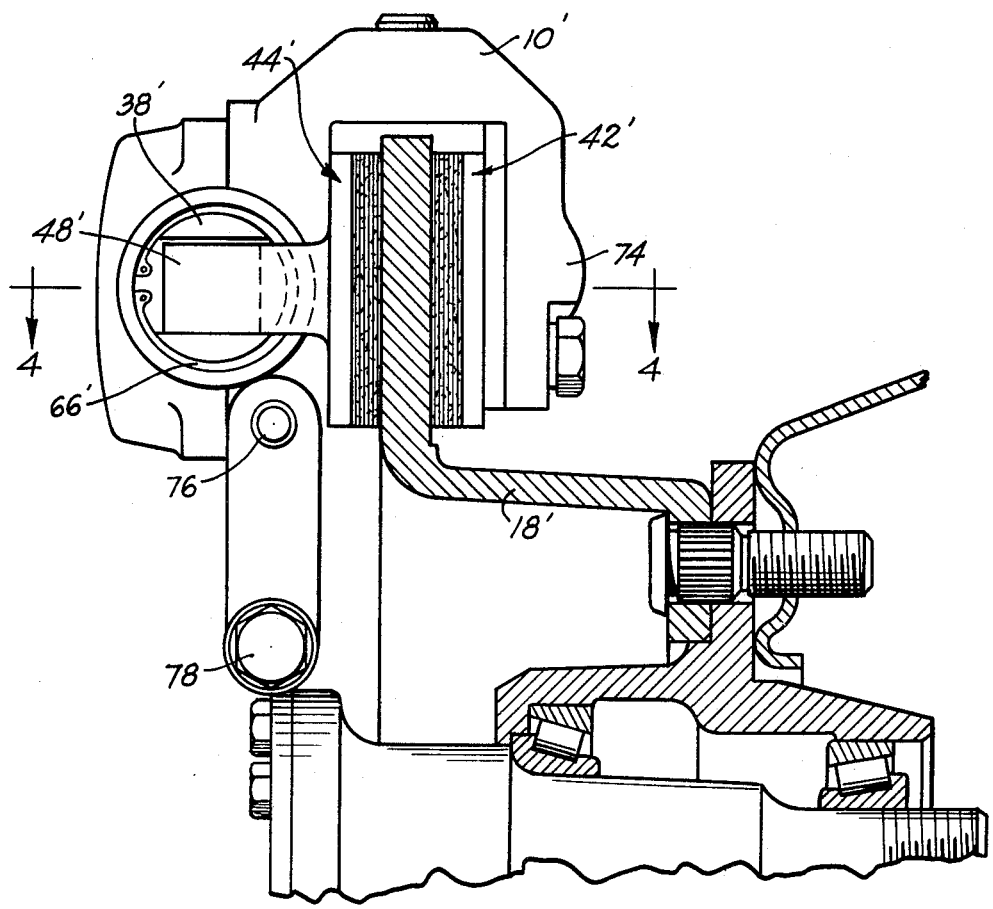
FIGURE 3 is a side elevational view of a single actuator thrust reaction movable housing type of brake.

Referring to FIGURES 3 and 4, a single actuator disc brake is shown with like reference numerals having prime marks affixed thereto designating the same elements as in the prior embodiment. A piston 34′ is utilized to move the friction member 44′ into engagement with its respective rotor friction surface 22′. A thrust reaction is transferred through the housing 10′ to a friction member 42′ which is secured through legs 72 and 74 of the housing. The housing rocks about the axes 76 and 78 to bring the friction member 42′ into engagement with its respective rotor surface 20′.

In this embodiment torque transfer to the piston 38′ is utilized in a different manner than in the previous embodiment. In brake operation the initial displacement of fluid by the master cylinder piston acts to move the piston 34′ to force the shoe 44′ into engagement with the rotor 18′. When the shoe engages the rotor further displacement of fluid is required to compensate for losses before any appreciable or additional working pressure is built up in the brake system. For example, fluid must fill the cavities 75 between the O-ring 76, groove 78 and the wall 80 of the chamber 36′ (see FIGURE 5), compensate for expansion of a brake hose leading from the master cylinder to the brake and compensate for mechanical deflections before an appreciable amount of working pressure will build up in the braking system. According to this embodiment, the torque exerted on the friction member by the initial engagement thereof with the rotor will be transferred to the piston 38′ to move the piston to displace the required amount of fluid at low pressure to bring the brake system up to the low end of its working fluid pressure. Thus, the volume of fluid required from a master cylinder or other source of controlled pressure will be reduced. This will allow reducing the required cross sectional area of the master cylinder piston resulting in a greater p.s.i. pressure in the fluid system with the same amount of pedal input force. In addition to the above, utilization of full movement of the master cylinder piston for building up pressure in the brake system will be effected.

The effect of the instant device upon the operator of an automobile will result in more braking force being effected with the same normal pedal force and throughout movement of the brake pedal displacing fluid from the master cylinder, pressure will be increasing rather than giving a steady solid "pedal feel," an increase of pressure for the initial movement of the brake pedal giving a solid "pedal feel" and then a period of movement in which there is not any or very little increase in pressure giving a mushy or spongy "pedal feel" and then an increase in pressure giving a solid pedal feel.

The friction member surface 49 is spaced from an annular anchoring surface 82 of the housing 10′ by a distance "D" which is equal to a predetermined amount of servo piston 38′ travel for injecting a volume of fluid at low pressure into the brake system, at the start of brake application, equal to fluid volume required to bring the brake system up to the low end of its working fluid pressure.

In operation, assuming rotation of the rotor in the direction of the arrow A′ the friction member 44′ will be moved a distance "D" in a plane substantially parallel to the plane of the rotor 18′ and in the same direction of arrow A′, thereby moving the piston 38′ in the same direction of arrow A′ appreciably displacing a predetermined amount of fluid during which there is no working pressure build-up in the fluid chambers 40′ and 36′. When pressure builds up to the low end of the working pressure in the chamber 36′ and 40′ due to further displacement of the master cylinder piston, further displacement of fluid by piston 38′ is not possible since the friction member 44′ anchors against the surface 82.

The actuating and servo piston arrangement of FIGURE 4 may also be used in conjunction with an opposed actuating type disc brake wherein the same type of arrangement of the actuating piston and servo piston of FIGURE 4 is utilized on each side of the rotor whereas the arrangement of FIGURE 2 would be utilized without the valve spool 62 and valve seat 64. However, it must be remembered that in the embodiment of FIGURE 2 the actuating pressure for the friction member 42 is derived solely from the torque exerted on the friction member 44, whereas when the valve member 40 and seat 64 are eliminated, chambers 36 and 32 will be intercommunicated to the same actuating pressure.

FIGURE 6 illustrates another embodiment of disc brake of the type illustrated in FIGURES 3 and 4 wherein parts similar to those of the embodiment of FIGURES 1 and 2 are designated with the same reference numerals with double prime marks affixed thereto. In this embodiment, torque exerted on the friction member 44″ is utilized to actuate another set of brakes in a brake system which could be on the same wheel or a different wheel. A line 84 would communicate the fluid displacement from chamber 40″ to a fluid motor of another set of brakes. Obviously the brakes actuated may be either drum or disc brakes.

The embodiment of FIGURES 1 and 2 can be modified to utilize torque exerted on the brake shoe 44 for actuating another set of brakes in a system by interconnecting chamber 32 with chamber 36 and by connecting line 60 with a fluid motor of another brake.

Although this invention has been described in connection with certain specific embodiments, the principles are susceptible to numerous other applications that will readily occur to persons skilled in the art.

I claim:
1. A disc brake comprising: a rotor having friction surfaces thereon, a housing including a first fluid chamber on one side of said rotor, a first piston slidably mounted in said chamber, a friction member located between a friction surface of said rotor and said first piston, means for guiding said friction member for movement toward and away from its respective rotor friction surface, said first piston being operatively connected to said friction member for moving the same into engagement with its respective friction surface, a second fluid chamber, a second piston slidably mounted in said second fluid chamber, said friction member being operatively connected to said second piston for transferring the torque exerted thereon to said second piston for moving said second piston to displace fluid in said second chamber, passage means interconnecting said fluid chambers, a valve member operatively connected to said second piston, said valve member being so constructed to cut off communication between said second fluid chamber and said first fluid chamber when said torque is transmitted to said second piston and to open communication therebetween when said second piston is in inoperative position, said second fluid chamber further having a fluid outlet port.

2. A brake as recited in claim 1 wherein said housing extends on the other side of said rotor, a second friction member operatively connected to said housing for movement toward and away from the friction surface of said rotor on the other side of said rotor, a support member, means connecting said housing to said support member, said connecting means being so constructed that said housing can move generally in a plane transverse to the plane of said rotor friction surfaces.

3. A brake as recited in claim 1 wherein said housing is stationary.

4. A disc brake comprising: a rotor having friction surfaces thereon, a housing including a first fluid chamber on one side of said rotor, a first piston slidably mounted in said chamber, a friction member located between a friction surface of said rotor and said first piston, means for guiding said friction member for movement toward and away from its respective rotor friction surface, said first piston being operatively connected to said friction member for moving the same into engagement with its respective friction surface, a second fluid chamber, a second piston slidably mounted in said second fluid chamber, said friction member being operatively connected to said second piston for transferring the torque exerted threreon to said second piston for moving said second piston to displace fluid in said second chamber, passage means interconnecting said fluid chambers, a valve member operatively connected to said second piston, said valve member being so constructed to cut off communication between said second fluid chamber and said first fluid chamber when said torque is transmitted to said second piston and to open communication therebetween when said second piston is in inoperative position, said housing having a third fluid chamber located on the other side of said rotor, a third piston slidably mounted within said third fluid chamber for movement generally transverse to the plane of said rotor friction surfaces, a second friction member located between said third piston and the other of said rotor friction surfaces, means for guiding said second friction member toward and away from its respective rotor friction surfaces, and fluid passage means connecting said second fluid chamber with said third fluid chamber for conducting fluid to said third piston, whereby fluid derived solely from transfer of said torque is transmitted to said third piston for engaging said second friction element with its respective rotor friction surface.

5. A disc brake comprising: a rotor having friction surfaces thereon, a housing including a first fluid chamber on one side of said rotor, a first piston slidably mounted in said chamber for movement in a direction generally transverse to the plane of said rotor friction surfaces, a friction member located between a friction surface of said rotor and said first piston, means for guiding said friction member for movement toward and away from its respective rotor friction surface, said first piston being operatively connected to said friction member for moving the same into engagement with its respective friction surface, a second fluid chamber, a second piston located in said second fluid chamber and movable in a direction generally transverse to movement of said first piston, said friction member being operatively connected to said second piston for transferring the torque exerted thereon to said second piston for moving said second piston to displace fluid in said second chamber, passage means interconnecting said fluid chambers, a valve member operatively connected to said second piston, said valve member being so constructed to cut off communication between said second fluid chamber and said first fluid chamber when said torque is transmitted to said second piston and to open communication therebetween when said second piston is in inoperative position, said second fluid chamber further having a fluid outlet port.

6. A disc brake comprising: a rotor having friction surfaces thereon, a housing including a first fluid chamber on one side of said rotor, a first piston slidably mounted in said chamber for movement in a direction generally transverse to the plane of said rotor friction surfaces, a friction member located between a friction surface of said rotor and said first piston, means for guiding said friction member for movement toward and away from its respective rotor friction surface, said first piston being operatively connected to said friction member for moving the same into engagement with its respective friction surface, a second fluid chamber, a second piston located in said second fluid chamber and movable in a direction generally transverse to movement of said first piston, said friction member being operatively connected to said second piston for transferring the torque exerted thereon to said second piston for moving said second piston to displace fluid in said second chamber, passage means interconnecting said fluid chambers, a valve member operatively connected to said second piston, said valve member being so constructed to cut off communication between said second fluid chamber and said first fluid chamber when said torque is transmitted to said second piston and to open communication therebetween when said second piston is in inoperative position, said housing having a third fluid chamber located on the other side of said rotor, a third piston slidably mounted within said third fluid chamber for movement generally transverse to the plane of said rotor friction surfaces, a second friction member located between said third piston and the other of said rotor friction surfaces, means for guiding said second friction member toward and away from its respective rotor friction surfaces, and fluid passage means connecting said second fluid chamber with said third fluid chamber for conducting fluid to said third piston, whereby fluid derived solely from transfer of said torque is transmitted to said third piston for engaging said second friction element with its respective rotor friction surface.

7. A disc brake comprising: a rotor having friction surfaces thereon, a housing including a first fluid chamber on one side of said rotor, a first piston slidably mounted in said chamber for movement in a direction generally transverse to the plane of said rotor friction surfaces, a friction member located between a friction surface of said rotor and said first piston, means for guiding said friction member for movement toward and away from its respective rotor friction surface, said first piston being operatively connected to said friction member for moving the same into engagement with its respective friction surface, a second fluid chamber, a second piston located in said second fluid chamber and movable in a direction generally transverse to movement of said first piston, said friction member being operatively connected to said second piston for transferring the torque exerted thereon to said second piston for moving said second piston to displace fluid in said second chamber, said connection comprising a groove on said second piston extending in a direction generally perpendicular to said rotor friction surfaces and a flange on said friction member extending within said groove for sliding and abutting movement with said second piston.

8. A brake as recited in claim 7 wherein fluid passage means interconnects said fluid chambers.

9. A disc brake as recited in claim 8 wherein a valve member is operatively connected to said second piston, said valve member being so constructed to cut off communication between said second fluid chamber and said first fluid chamber when said torque is transmitted to said second piston and to open communication therebetween when said second piston is in inoperative position, said second fluid chamber further having a fluid outlet port.

10. A disc brake comprising: a rotor having friction surfaces thereon, a housing including a first fluid chamber one one side of said rotor, a first piston slidably mounted in said chamber for movement in a direction generally transverse to the plane of said rotor friction surfaces, a friction member located between a friction surface of said rotor and said first piston, said first piston being operatively connected to said friction member for moving the same into engagement with its respective friction surface, a second fluid chamber, a second piston located in said second fluid chamber and movable in a direction generally transverse to movement of said first piston, said friction member being operatively connected to said second piston for transferring the torque exerted thereon to said second piston for moving said second piston to displace fluid in said second chamber, said connection comprising a groove on said second piston extending in a direction generally perpendicular to the plane of said rotor friction surfaces and a flange on said friction member extending within said groove for sliding and abutting relationship with said second piston, said friction member having a second flange at the other end of said friction member slidably carried by said housing, said friction member being guided by said flanges for movement toward and away from its respective rotor friction surface.

References Cited by the Examiner

UNITED STATES PATENTS

| | | | |
|---|---|---|---|
| 2,419,113 | 4/47 | Bricker | 188—73 X |
| 2,533,186 | 12/50 | Bricker et al. | 188—73 |
| 3,100,553 | 8/63 | Butler | 188—73 |

ARTHUR L. LA POINT, *Primary Examiner.*

EUGENE G. BOTZ, *Examiner.*